United States Patent
Frey et al.

(10) Patent No.: US 8,909,727 B2
(45) Date of Patent: Dec. 9, 2014

(54) RDMA READ DESTINATION BUFFERS MAPPED ONTO A SINGLE REPRESENTATION

(75) Inventors: Philip Frey, Uerikon (CH); Bernard Metzler, Zurich (CH); Animesh Kumar Trivedi, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 13/300,740

(22) Filed: Nov. 21, 2011

(65) Prior Publication Data
US 2012/0131124 A1 May 24, 2012

(30) Foreign Application Priority Data
Nov. 24, 2010 (EP) .................................. 10192374

(51) Int. Cl.
*G06F 15/173* (2006.01)
*G06F 15/16* (2006.01)
*H04L 12/861* (2013.01)
*H04L 1/18* (2006.01)
*H04L 29/08* (2006.01)
*G06F 13/28* (2006.01)

(52) U.S. Cl.
CPC .............. *G06F 15/16* (2013.01); *H04L 49/9047* (2013.01); *H04L 1/1835* (2013.01); *G06F 13/28* (2013.01); *H04L 49/9068* (2013.01); *H04L 67/1097* (2013.01)
USPC ............................................ 709/212

(58) Field of Classification Search
CPC ............ H04L 49/9047; H04L 49/9068; H04L 1/1835; H04L 67/1097; G06F 13/28
USPC ............................................ 709/212
See application file for complete search history.

(56) References Cited

U.S. PATENT DOCUMENTS 7,580,406 B2 * 8/2009 Shah et al. ..................... 370/389
7,633,955 B1 * 12/2009 Saraiya et al. ................. 370/401

(Continued)

OTHER PUBLICATIONS

Hilland, et al., "RDMA Protocol Verbs Specification," Apr. 25, 2003, http://www.rdmaconsortium.org/home/draft/-hilland-iwarp-verbs-v1.0-RDMAC.pdf.

(Continued)

*Primary Examiner* — Larry Donaghue
(74) *Attorney, Agent, or Firm* — Tutunjian & Bitetto, P.C.; Jennifer Davis (57) ABSTRACT

A computer-implemented method, system, and article of manufacture for data communication between a requester and a responder in a remote direct memory access (RDMA) network, where each of the requester and the responder is an RDMA-enabled host of the network. The method includes: sending a request for the responder to provide data, where the request includes a mapped steering tag that is obtained by mapping a set of memory buffers of the requester onto a single representation that allows for identifying each of the memory buffers of the set; and receiving the requested data together with the mapped steering tag and assigning the data being received to the memory buffers of the set consistently with the mapping.

14 Claims, 3 Drawing Sheets

(56) References Cited

U.S. PATENT DOCUMENTS

| | | | |
|---|---|---|---|
| 2005/0015469 A1* | 1/2005 | Zuberi | 709/220 |
| 2005/0240678 A1* | 10/2005 | Hufferd et al. | 709/246 |
| 2007/0078940 A1* | 4/2007 | Fineberg et al. | 709/216 |
| 2008/0043750 A1* | 2/2008 | Keels et al. | 370/395.52 |
| 2008/0126509 A1* | 5/2008 | Subramanian et al. | 709/214 |
| 2008/0301311 A1* | 12/2008 | Bestler | 709/230 |
| 2009/0292861 A1* | 11/2009 | Kanevsky et al. | 711/103 |
| 2010/0083247 A1* | 4/2010 | Kanevsky et al. | 718/1 |
| 2010/0183024 A1* | 7/2010 | Gupta | 370/463 |

OTHER PUBLICATIONS

Recio, et al., "RFC 5040—A Remote Direct Memory Access Protocol Specification," Oct. 2007, http://www.faqs.org/rfcs/rfc5040.html.

Pinkerton, et al., "Direct Data Placement Protocol (DDP)/Remote Direct Memory Access Protocol (RDMAP) Security," Oct. 2007, http://www.faqs.org/rfcs/rfc5042.html.

* cited by examiner

RDMA READ DESTINATION BUFFERS MAPPED ONTO A SINGLE REPRESENTATION

CROSS-REFERENCE TO RELATED APPLICATIONS

This application claims priority under 35 U.S.C. §119 to European Patent Application No. 10192374.6 filed Nov. 24, 2010, the entire contents of which are incorporated by reference herein.

BACKGROUND OF THE INVENTION

1. Field of the Invention

The present invention relates to remote direct memory access (RDMA), and more specifically, to RDMA read requests in RDMA networks.

2. Description of the Related Art

Sending and receiving application data over a computer network brings about data copy operations on both sending and receiving hosts. In a multi-user operating system, data typically needs to be copied between application space and operating system kernel. In these systems, the application generates and consumes data while the operating system kernel is responsible for eventually shipping data to a remote application over a network or for receiving remote application data from the network. When using connection-oriented, reliable transport protocols such as TCP, which rely on data retransmissions for guaranteeing data delivery, the copy of the data in kernel space is critical as temporary buffer for re-fetching the data for the retransmits.

Remote Direct Memory Access (RDMA) is a communication paradigm where application data is fetched directly out of a computer's local application memory and directly placed into the application memory of a remote computer. In bypassing the operating system and avoiding intermediate data copies in host memory, RDMA significantly reduces the CPU cost of large data transfers. Complete data copy avoidance (zero-copy) is furthermore achieved if the network interface card (NIC) is able to move networked data directly between the application buffer and NIC buffer using a Direct Memory Access (DMA) engine.

With RDMA, in order to allow the DMA engine of the NIC to move the data between the application buffer and the NIC buffer, the application buffer (memory region) first has to be registered with the NIC. After successful registration, the application buffer, which now can also be referred as a "tagged buffer", is identified through a unique steering tag (STag). Each RDMA access to a tagged buffer is described by the tuple of STag, tagged offset (TO), and length (len).

An STag identifies an application memory buffer which is already registered with the RNIC Interface (RI) for access. It is a 32-bit identifier including two sub-fields: a consumer provided STag key and an RI provided STag index. The STag key contains the least significant 8 bits of the STag. The STag index contains the 24 most significant bits of the STag. The STag Key is provided by the consumer, the STag index is provided by the RNIC. The consumer can use the STag key as desired. The tagged offset points to the first byte of the memory buffer referenced by the STag which should get accessed.

Two different methods to assign the TO are described. The TO can be the offset in bytes from the beginning of the buffer, or it can be the virtual address of the first byte to be accessed. The length describes the length of the set of bytes to be accessed within the buffer, starting with the first byte defined by TO. The STag together with the tagged offset (TO) and length are used for all subsequent remote data transfers over the network. All local and remote memory accesses require the use of an STag.

For example, a data transfer according to the RDMA Verbs specification works as follows:

1. The application posts RDMA work requests (WRs) defining the data transfers to work queues which are accessible by an RDMA device;
2. An RDMA device processes these WRs asynchronously and in order;
3. The RDMA device notifies the application through a completion event upon completion of the WR processing;
4. The application reaps the work completion (WC) corresponding to the WR from the completion queue.

Also, the work requests are used to define the following:

1. The data transfer operation type (Send, Receive, RDMA Read, RDMA Write);
2. The source buffer for Sends, RDMA Reads and RDMA Writes; and
3. The destination buffer for Receives, RDMA Reads and RDMA Writes.

Depending on the data transfer operation, the source buffer is either local (Send, RDMA Write operations) or remote (RDMA Read operations). Accordingly, the destination buffer is local for RDMA Read and Receive operations and remote for RDMA Write operations. For the Send and RDMA Write data transfer operations, the source buffer (local) can be non-contiguous. Non-contiguous buffers are referred to by means of scatter/gather lists which contain a number of scatter/gather elements. Each such scatter/gather element refers to a single application buffer identified by a STag, the TO and the length.

The following documents provide useful additional details:

RDMA Protocol Verbs Specification (http://www.rdma-consortium.org/home/draft-hilland-iwarp-verbs-v1.0-RDMAC.pdf);
RDMA Protocol (http://www.faqs.org/rfcs/rfc5040.html);
Direct Data Placement (http://www.faqs.org/rfcs/rfc5042.html)

SUMMARY OF THE INVENTION

According to an aspect of the present invention, a computer-implemented method is provided for data communication between a requester and a responder in a remote direct memory access (RDMA) network, where each of the requester and the responder is an RDMA-enabled host of the RDMA network. The method includes: sending a request for the responder to provide data, where the request includes a mapped steering tag, and the mapped steering tag is obtained by mapping a set of memory buffers of the requester onto a single representation that allows for identifying each of the memory buffers of the set; and receiving the requested data together with the mapped steering tag and assigning the data being received to the memory buffers of the set consistently with the mapping. The sending and receiving steps are performed at the requester.

According to another aspect of the present invention, a computerized system that is configurable as an RDMA enabled host and connectable to a network is provided. The system includes a set of memory buffers and computer program code means designed to cause the computerized system to implement the steps of the method according to the present invention, when executed thereon.

According to still another aspect of the present invention, an article of manufacture tangibly embodying computer readable instructions, which when implemented, causes a computer system to carry out the steps of the method of the present invention.

BRIEF DESCRIPTION OF THE DRAWINGS

Methods and systems embodying the present invention will now be described, by way of non-limiting examples, and in reference to the accompanying drawings, where.

DETAILED DESCRIPTION OF THE PREFERRED EMBODIMENTS

As an introduction to the following description, general aspects of the present invention will be described and directed to RDMA data communication between hosts connected by a network. The present scheme implies sending (from a requester) a request for the responder to provide data and then receiving the requested data at the requester, for subsequent assignment of the data to intended buffers.

The request includes a modified steering tag, hereafter called SSTag (for "shadow" steering tag). The SSTag hides one or several STags and possibly can be associated with additional information. The SSTag is actually obtained by mapping a set of memory buffers (e.g. logical buffers) of the requester into a single representation (e.g., via a scatter/gather list). Accordingly, the terminology "mapped steering tag" shall be used as well.

For example, in a particularly simple implementation, STags associated with multiple logical memory buffers are coalesced into a single SSTAG. When receiving the requested data together with the SSTag, the latter is used to identify the intended memory buffers. The received data can thus be assigned consistently with the previous mapping. This simple scheme allows for assigning data obtained from a single read request to several buffers. Non-contiguous Read destination buffers can accordingly be contemplated.

Before sending the request, the mapped steering tag can further be associated with additional data. At least part of the additional data (e.g., a cumulative buffer length and a local buffer address) can, for instance, be sent together or within the request (i.e., put on wire) and received back. Conversely, part of the additional data associated to the SSTag can be kept locally (i.e., not put on wire). This is notably useful when additional data pertain to traffic class (such as to locally permit a preferential treatment in resource allocation and packet scheduling for the request). This also is useful when the additional data relate to e.g., a status of or permissions associated to the SSTag, which one may not want to put on wire, e.g., for security reasons.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

A combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection of wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or a suitable combination thereof. A computer readable signal medium can be a computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in a combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
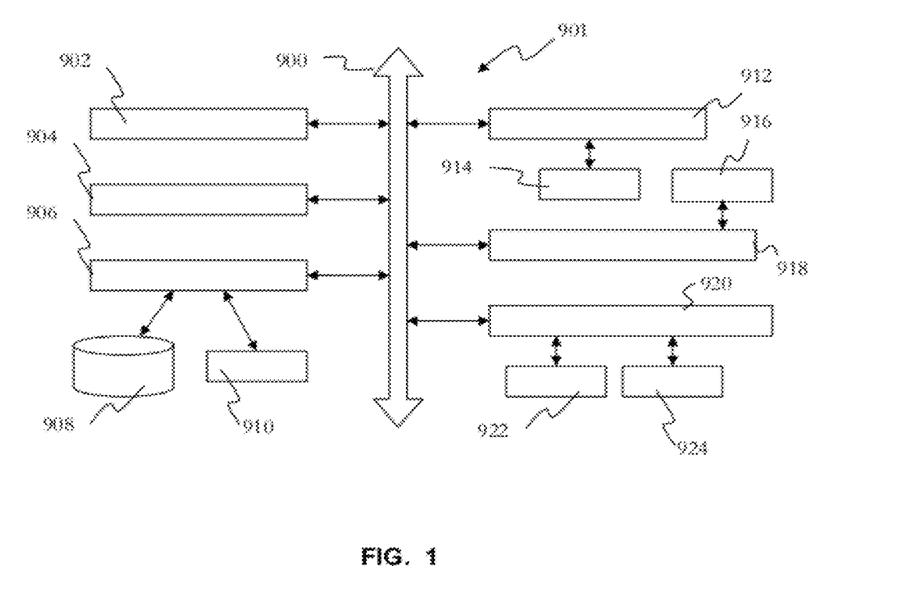
FIG. 1 is a block diagram of a computerized system such as a RDMA host, as involved in embodiments of the present invention.

FIG. 1 is a block diagram of hardware of RDMA host (e.g., a server), as involved embodiments. The computer system 901 includes a CPU 904 and a main memory 902, which are connected to a bus 900. The bus 900 is possibly connected to a display controller 912, and the later connected to a display 914 such as an LCD monitor (although this is not so relevant here). The bus 900 is also connected to a storage device such as hard disk 908 or solid state drive 910 through a device controller 906 such as a SATA or flash controller. The bus 900 is further possibly connected to a keyboard 922 and a mouse 924 through a keyboard/mouse controller 920 or a USB controller not shown (not relevant here). The bus is also connected to a communication controller 918 conform to, for example, an Ethernet protocol (or host channel adapters, etc.). The communication controller 918 is used to physically connect the computer system 901 to the outer world, i.e., a network 916. The communication controller 918 can for instance include or communicate with a RDMA network interface card (RNIC), as discussed below.

Figure 2:
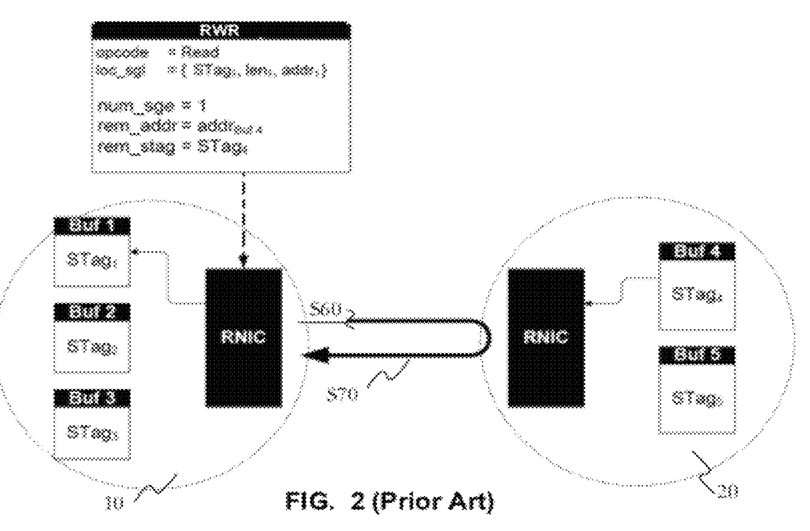
FIG. 2 shows a data flow diagram with chosen steps of a prior art method of RDMA read data operation.
Figure 3:
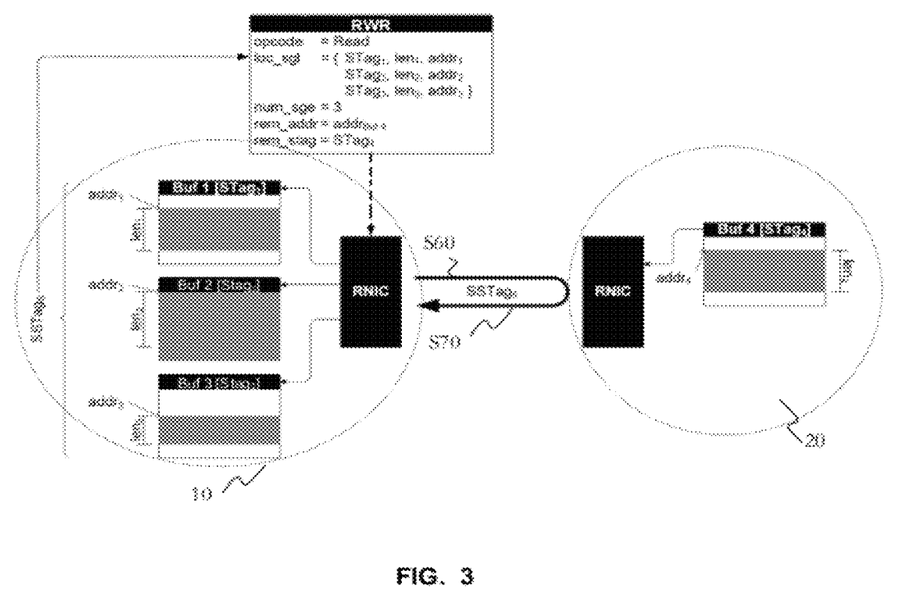
FIG. 3 is a data flow diagram with chosen steps of a method of RDMA read data operation, according to embodiments of the present invention.

FIGS. 2 and 3 are data flow diagrams illustrating RDMA read operations as implemented in a prior method (FIG. 2) vs. embodiments of the present invention (FIG. 3). The following makes a comparison of FIGS. 2 and 3 to emphasize distinguishing features of present embodiments with respect to typical RDMA read operations.

FIGS. 2 and 3 have nonetheless a number of common features and steps, which are discussed first. In each case, a data communication scheme is contemplated, which involves RDMA enabled hosts connected to a network, i.e., a requester 10 and a responder 20. The requester 10 sends (step S60) a request for the responder 20 to provide data. The requested data are later received, step S70, and subsequently assigned to (at least) one buffer of the requester. In each case, an identifier is sent together with the request, and subsequently returned together with the requested data, which allows for a safe assignment of the received data within the local, temporary memory.

A usual RDMA read request is described by the data length of the operation in bytes, data buffer of responder identified by the remote STag and remote tagged offset, as well as with the requester's data buffer described by local STag and local tagged offset. The RDMA read response includes a set of messages carrying the requested data, length of the data, with STag and tagged offset of the requester. The cumulative length of all data carried in the set of response messages must be equal to the length originally requested in the corresponding RDMA read request. The tagged offset of the first RDMA read response message must be equal to the local tagged offset of the RDMA read request. The tagged offset of all subsequent RDMA read response messages must be assigned the offset of the initial message incremented by the length of data already sent in previous messages including the first response of the set. The STag together with the tagged offset in the response message uniquely identifies the address where data has to be assigned.

The creation of an RDMA read request might involve several steps, as known per se. Typically, at the requester side, an application creates an RDMA Read work request RWR, where local destination buffer is described as a single entry of a scatter/gather list. The latter is suitably identified by an STag, length and tagged offset.

For instance, in the example of FIG. 2, the request RWR includes standard instructions, such as to specify:
 the operation to be performed ('opcode=Read');
 the local scatter/gather list, represented by 'loc_sgl={$STag_1$, $len_1$, $addr_1$}';
 which list is accompanied by number of elements. In the case of a Read operation, this number is 1 ('num_sge=1');
 the remote buffer address ('rem_addr=$addr_{Buf4}$') and corresponding STag ('rem_stag=$STag_4$').

Accordingly, the RWR request as created by the application already contains the STag. The application then posts the request RWR to a send queue accessible by the RDMA device (i.e., a RNIC in this case). The RDMA device (RNIC) can thus reap the work request for processing and transform it into a work queue element (or WQE), in order to keep track of the context in which the work request was posted. The local device RNIC can then send the request to the remote RNIC (at the responder) and stores the WQE in the outbound RDMA Read queue (or ORQ). Later, the responder sends back the requested data by means of an RDMA Read Response, together with the STag, step S70. Upon receipt of the requested data, the requester is able to assign the data to the correct buffer, because of the STag, tagged offset (or address) and length, which identifies a local buffer.

In the example of FIG. 2, the intended read destination buffer is 'Buf 1' (as identified by '$STag_1$'). This example illustrates a property of current RDMA systems, which permits one-to-one correspondence between registered buffers (memory regions) and STags. As a consequence, the use of non-contiguous buffers is restricted to Send and RDMA Write source buffers only. RDMA Read destination buffers must be contiguous, even though they are local. In order to spread data across non-contiguous buffers using RDMA Read operations, individual RDMA Read operations must be performed for each buffer element.

The disadvantages are four fold, due to:

Larger overhead on local and remote hosts (be it on the RNIC or in a software implementation) as multiple RDMA read operations must be processed;

Larger link utilization as for each local buffer one RDMA read request must be sent on the wire;

Longer latency as the overall communication requires not only a single round trip but one round trip per buffer element; and A more complex protocol (several RDMA Read operations instead of a single one necessary).

Embodiments of the present invention as described herein propose a means to enable multiple and thus non-contiguous buffers for RDMA Read destinations. To that end, use is made of a virtual, "Shadow" STag or SSTag for short. This SSTag is obtained by locally mapping a set of buffers of the requester onto a single representation.

Accordingly, when receiving the requested data together with the SSTag, the received data can be safely assigned, consistently with the previous mapping, which allows for retrieving the desired local buffers. For instance, while a usual STag identifies a single destination buffer (e.g., '$STag_1$' for 'Buf 1' in FIG. 2), the SSTag returned in FIG. 3 allows for identifying several buffers (i.e., 'Buf 1', 'Buf 2' and 'Buf 3' in FIG. 3) to which the received data can subsequently be assigned.

The mapping operation can for instance use elements from a scatter/gather list, i.e., entries of the list are mapped onto a single representation. Preferably, usual STag data (and additional data, if needed) are coalesced into a virtual SSTag. To that end, the local device 10 can maintain a look-up table, which keeps track of various mappings of STags onto respective SSTags. Associated STags can then later be mapped (or broken) down to buffer address, offset and length where data would be assigned.

If a single STag gets mapped into one SSTag, the original local tagged offset (TO) can be assigned to the corresponding RDMA read request carrying the mapped SSTag. Upon receiving the set of corresponding inbound RDMA read response messages, the SSTag is re-mapped onto the original STag. The original STag contains the local TO which is used to locate the offset within the requester's data buffer where the data must be assigned.

If, for a RDMA read request, a set of original local STags gets mapped into one SSTag, then, preferably, the cumulative length of all local buffers must be put in the RDMA read request as request length, such that the responder knows how many bytes of data to send back. However, applications can be contemplated where such information is predetermined, implicit or known by the responder.

Furthermore, the local TOs of all buffers referenced by their STags also can be mapped. Accordingly, the SSTag sent to the responder can be associated with additional information, going beyond the mere identification of mapped buffers. At least part of the additional data (e.g., buffer lengths, a local buffer address or a tagged offset) can for instance be sent together or within the request (i.e., put on wire) and received back. In variants, additional information (or at least a part thereof) is kept locally. Upon receiving the requested data together with the steering tag, the additional information which is associated with the SSTag received can nonetheless be locally identified and suitably used. In other variants, part of the additional information associated with the SSTag is put on wire while another part is kept locally.

For instance, the following two processes might be appropriate in some embodiments:

(1) The local TO of the READ request is set to the TO of the buffer referenced by the first element in the set of mapped STags. When processing the corresponding RDMA read response messages, the following rules can apply to determine the correct buffer and offset where to assign the received data:

(a) Cumulative length of all bytes already received so far can be calculated by subtracting the received local TO in RDMA read response message by the local TO used in the RDMA read request.

(b) The obtained cumulative length is decremented by the length of the local data buffers, which are mapped with STags, starting with the length of the buffer referenced by the first STag. This step can be repeated as long as the cumulative length is larger than the length of the current local buffer.

(c) Adding the remaining cumulative length to the TO of the current buffer (buffer element in set where step 2 above has stopped) gives the position where the data in RDMA read response are to be assigned.

(d) If the remaining cumulative data length exceeds the length of the current buffer, the buffer gets completely filled. The remaining data bytes are placed into the successive buffer referenced by the next STag, starting at the TO assigned with that STag.

(2) Another implementation may involve hiding the original TO associated with an STag by assigning an arbitrary value to it. The new assigned value is used as the local TO in the RDMA read request. The system can store the difference between original TO of the first STag and TO chosen for the RDMA read request with the SSTag mapping. Upon processing a corresponding RDMA read response message referencing the same SSTag, the received TO is adjusted based on the stored difference between original and chosen TO to determine the correct TO regarding to the first local buffer. After calculating the original TO RDMA read response processing can continue as described in process (1) above.

Not transferring the real TO of the first local buffer on the wire helps to avoid exposing local resources to any unauthorized third party. When used together with mapping the Steering Tag(s) of the local buffer(s), for RDMA read requests all local address information (STag, TO, etc.) can be kept local and is not exposed to any third party including the responder. Given the latter security advantage, mapping the TO might also be applicable to the mapping of a single STag to an SSTag.

In the example of FIG. 3, $SSTag_6$ is associated with the following set of parameters: $STag_1$, $len_1$, $addr_1$, $STag_2$, $len_2$, $addr_2$, $STag_3$, $len_3$, $addr_3$. Accordingly, each mapped STag, i.e., $STag_1$, $STag_2$ and $STag_3$ has an application buffer address and length associated thereto. A modified RDMA read request including an SSTag requests data for the combined buffer lengths. In FIG. 3, this would correspond to ($len_1$+$len_2$+$len_3$) bytes. The incoming data associated with the Read request is then sequentially assigned to the buffers as they appear in the scatter gather list as described above. The first $len_1$ bytes of incoming read data would be assigned to buffer associated with $STag_1$ (starting at $addr_1$) and so on. The exact destination address is calculated with the help of the re-mapped STag and associated tagged offset in the data buffer.

In practice, an application can create an RDMA read request which includes the scatter/gather list, forward it to the requester RNIC, which can subsequently map it onto a virtual SSTag, before sending the data request to the remote device. The SSTag has preferably the same data structure as usual STags. Therefore, an STag can be readily substituted by a generated SSTag in a usual RDMA read request by the local RNIC 10.

Remarkably, and as evoked earlier, the present scheme further allows for associating additional information to the SSTag, like buffer lengths, addresses, etc. Such information can also includes further data to be later used for any suitable purpose, e.g., enhancing security and quality of service for RDMA traffic. For example, the additional information can concern permissions, access rights, or the like. This can for instance be information as to a status of the SSTag, whereby the status of the received SSTag can be checked prior to processing the received data.

A particularly interesting application concerns the management of the lifespan of SSTags. For example, a cardinality C can be associated to a SSTag. Upon safe completion of a read operation, C can be altered (e.g., changed from 1 to 0), while still being associated to the SSTag involved in that read operation, say $SSTag_x$. The new value of C indicates that $SSTag_x$ is not "active" anymore (and thus available for a new mapping, if necessary). Thus, if the local device later receives $SSTag_x$, it can check in look-up table the current status of $SSTag_x$, and make any informed decision, e.g., generate an error message, dump the received data, etc. In variants, C can take more than 2 values, e.g., 0 for inactive, C>0 for active (1, 2, 3 . . . corresponding to respective application areas.

Another area of interest in the present context relates to the implementation of RDMA traffic classes by associating related semantics to the generated SSTags. A generated SSTag can belong to a particular traffic class that can be the subject of preferential treatment by a RDMA device. It can for instance be implemented by way of a pool of candidate SSTags associated with different traffic classes. For example, a high priority class can have high number of SSTags on its disposal for use. Hence it allows more outstanding number of RDMA read requests from that particular traffic pool. A higher number of requests that get processed results in better quality of service. For example, a video streaming traffic class can have higher number of possible SSTag than a low priority backup service running in background. The pool of SSTag enables RDMA devices to prioritize the RDMA read request traffic and to guarantee availability of resources for better quality of service. Another advantage is to have global control over the total number of outstanding RDMA read requests. Parameters such as inbound and outbound queue depth (IRD and ORD) provide limited per queue pair scope for controlling RDMA traffic. By controlling the pool size system administrator can have tighter global limits on possible RDMA read traffic usage.

Remarkably, the local RNIC may, in some embodiments of the present invention, proceed to randomize an SSTag before sending it, for improved security. Accordingly, monitoring successive SSTags cannot allow for retrieving information about the memory structure of the requester. A given SSTag pertains to (and is valid for) one read request only. This helps in cases where applications do not wish to generate a new STag for each read request which, for security reasons, can be invalidated after completion of corresponding read response processing. Applications can hide actual STag by sending out requests using one-time SSTag (possibly generated randomly). Randomization thus helps to make sure that no illicit read responses are sent (and writes are done) out on the actual STag and associated memory region. Any convenient randomization function can be used to generate SSTag numbers, e.g., using the initial set of STags as seed. Thus even a compromised RDMA read request stream does not expose the original STags on the wire because it only contains a one-time SSTag. Even though attackers can snoop in to read SSTag (perhaps by using brute force attacks), a worst case scenario may result in granting access only once to the associated memory region. If the legitimate read response is received before than a compromised response, the latter can be identified and discarded as an SSTag can be invalidated by the prior legitimate response. This makes man-in-middle and akin attacks difficult for unchecked access to memory regions.

In that respect, instead of physical buffers, logical buffers are preferably contemplated here. Thus, in some embodiments of the present invention, multiple logical buffers are combined, using one shadow STag only, at variance with the RDMA standard, where one STag uniquely identifies one logical data buffer. Note that a single logical buffer can actually hide multiple physical buffers.

Relying on logical buffers instead of physical buffers has multiple advantages. Notably, it helps in memory virtualization and sharing among processes; it makes application design simpler as they do not have to care of available physical memory in the system; and it allows development of relocatable code and shared libraries for efficient sharing of code and improved locality.

Therefore, the application buffers (in user space) referred to in the present application preferably denotes logical buffers. Accordingly, memory access is carried out by way of logical addresses which are then internally translated to actual physical addresses by virtual memory address translation mechanisms such as segmentation and paging, etc.

Figure 4:
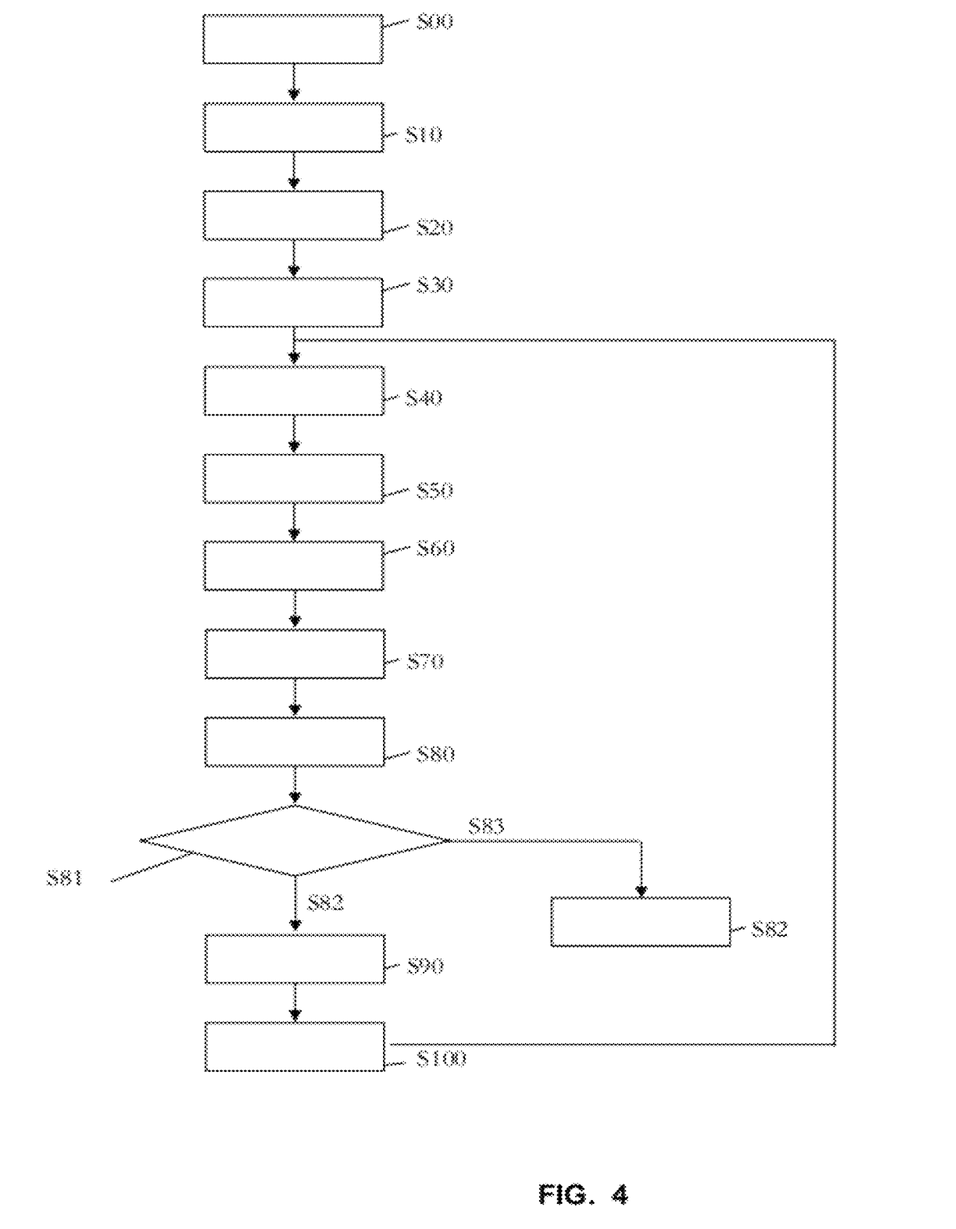
FIG. 4 is a flowchart reflecting steps as in specific embodiments of the method according to the present invention.

FIG. 4 is a flowchart reflecting steps implemented in specific embodiments of data communication between hosts 10, 20 such as described in reference to FIGS. 1-3. As it shall be appreciated by the skilled person, such embodiments contain a number of optional steps with respect to the more general embodiments described above. Yet, embodiments described below enable non-contiguous RDMA Read destination buffers and this, without requiring substantial modifications (or possibly no modification at all in some cases) of the application interface.

Referring now more particularly to FIG. 4, the process can use a scattered (local) buffer for reading remote data as follows:

Step S00: A RDMA network is provided, which at least includes two RDMA enabled hosts (a requester 10 and a responder 20, using buffers Buf 1-3 and Buf 4-5, respectively).

Step S10: At the requester side, an application creates an RDMA Read work request RWR. At this point, the request as created at the level of the application typically resides in RAM. The local, logical destination buffers are described as a scatter/gather list ('loc_sgl' in FIG. 3). Such a list is known per se, it has multiple entries, each identifying a respective local buffer, e.g., Buf 1-3, by way of respective STags, lengths and addresses.

Step S20: The application posts the RDMA Read work request to a send queue accessible by a local RDMA device on the read requester side (i.e., a network interface card or RN IC, as evoked earlier). The remote RDMA device is located on the responder side. This, obviously, assumes a hardware implementation. In variants, at least some of the functional features of the RDMA device as described below could be implemented in software, e.g., within or used by the operating system of the hosts.

Step S30: The local RDMA device (RN IC) reaps the work request for processing and transforms it into a work queue element (or WQE).

Step S40: A shadow STag (SSTag) is generated (e.g., $SSTag_6$ in FIG. 3), which preferably is randomized before being sent. Then, the RDMA device (or any convenient hardware or software logic) associates the SSTag to the scatter/gather list and stores it, e.g., along with the usual STags, e.g., by way of a look-up table. A set of buffers is accordingly mapped onto a single representation. As evoked earlier, additional information can possibly be associated to the SSTag, e.g., by way of a cardinality C that determines a current status associated to the SSTag.

In a variant, a pool of randomized numbers can be created ex ante and are available for mapping: one particular number is then selected at step S40. The pool could for instance be associated with a traffic class of RDMA read request. In that case, the method preferably includes an additional step (S41, not shown), where, in the case the pool of possible SSTags is empty (all associated SSTag are in use), the read request is halted and waited until an SSTag is available. This incidentally allows for maintaining a fair share of network bandwidth among traffic classes.

Step S50: Here the RDMA device creates an ordinary RDMA Read Request, with the difference that the destination buffer identifier is replaced with the SSTag (having the same data structure as a usual STag).

Step S60: The local device (requester) sends the RDMA Read Request to the remote RDMA device (responder) and stores the WQE in the outbound RDMA Read queue (or ORQ).

Step S70: The responder sends back the requested data by means of an RDMA Read Response using the SSTag as destination buffer.

Step S80: Upon receipt of the inbound RDMA Read Response, the local device matches the Read Response to the WQE on the ORQ by means of the SSTag.

Step S81: The local device checks whether the Read request is fulfilled (this can for instance involve the additional information C). If yes (S82), the local device proceeds further to step S90. Else (S83), the requester shall generate an error message (and does not assign the data). This would be the case if e.g., the received SSTag is associated to C=0, denoting an inactive SSTag.

Step S90: The requester now proceeds to a reverse mapping of the SSTag (e.g., by way of the look-up table) and subsequently assigns the received data of the RDMA Read Response according to the scatter/gather list defined in the WQE.

Step S100: The requester can now update a status or permissions associated to the SSTag (e.g., by decreasing a cardinality C, which can lead to C=0, as evoked at step S81 and earlier). Accordingly, if the requester later receives data together with the same SSTag, associated with C=0, an informed decision can be made. In variants, the SSTag is simply de-allocated and a slot is freed in the traffic class pool. In all cases, the algorithm can loop back to step S40.

While the present invention has been described with reference to certain embodiments, it will be understood by those skilled in the art that various changes can be made and equivalents can be substituted without departing from the scope of the present invention. In addition, many modifications can be made to adapt a particular situation or material to the teachings of the present invention without departing from its scope. Therefore, it is intended that the present invention not be limited to the particular embodiment disclosed, but that the present invention will include all embodiments falling within the scope of the appended claims. For example, while it was merely referred to RDMA networks, it must be understood that embodiments of the present invention extend to distinct sets of memory buffers within e.g., a same computer, where a read data operation can be carried out from one set to the other according to a direct memory access.

What is claimed is:

1. A computer-implemented method of data communication between a requester and a responder in a remote direct memory access (RDMA) network, wherein each of the requester and the responder is an RDMA-enabled host of the RDMA network, the method comprising:
randomizing a value of a mapped steering tag at a requester;
sending a request for the responder to provide data, wherein the request comprises the randomized mapped steering tag, and the randomized mapped steering tag is obtained by mapping a set of memory buffers of the requester onto a single representation that allows for identifying each of the memory buffers of the set; and
receiving the requested data together with the randomized mapped steering tag and assigning the data being received to the memory buffers of the set consistently with the mapping,
wherein the sending and receiving steps are performed at the requester.

2. The method according to claim 1, wherein the randomized mapped steering tag sent at the step of sending is further associated with additional information, before sending the request.

3. The method according to claim 2, wherein:
at least part of the additional information is sent within the request and subsequently received together with the requested data and the randomized mapped steering tag, and
the additional information comprises:
a buffer cumulative length; and
a buffer address or a tagged offset.

4. The method according to claim 2,
wherein at least part of the additional information relates to a traffic class and is not sent within the request, and
the method further comprises:
prior to the sending step, allocating resource and/or scheduling packets for the request to be sent, based on the traffic class information.

5. The method according to claim 2,
wherein at least part of the additional information is not sent within the request, and
the method further comprises:
after the receiving step, identifying and using, at the requester, the part of the additional information which is associated with the randomized mapped steering tag as received together with the requested data.

6. The method according to claim 5, wherein:
at least part of the additional information allows for determining permissions, and
the step of identifying and using comprises identifying permissions associated with the randomized mapped steering tag as received.

7. The method according to claim 6, wherein:
at least part of the additional information comprises information as to a status of the randomized mapped steering tag, wherein the status is a lifespan, and
the step of identifying and using comprises checking the status of the randomized mapped steering tag as received.

8. The method according to claim 1, wherein:
the request sent at the step of sending is a RDMA read request,
the RDMA read request comprises the mapped steering tag, and
the randomized mapped steering tag has the same data structure as the single steering tag.

9. The method according to claim 1, wherein the randomized mapped steering tag is obtained by mapping a set of logical memory buffers.

10. The method according to claim 9, wherein at the step of sending, the randomized mapped steering tag is obtained by mapping a set of non-contiguous logical memory buffers.

11. The method according to claim 1, further comprising:
maintaining, at the requester, mappings of several sets of memory buffers onto respective randomized mapped steering tags.

12. The method according to claim 1, wherein the mapping of the randomized mapped steering tag uses a scatter/gather list.

13. A computerized system, configurable as an RDMA enabled host and connectable to a network, the system comprising a set of memory buffers and computer program code means designed to cause the computerized system to implement the steps of the method according to claim 1, when executed thereon.

14. An article of manufacture tangibly embodying computer readable instructions and stored on a non-transitory computer readable storage medium which when implemented causes a computer system to perform the steps of a computer-implemented method for data communication between a requester and a responder in a remote direct memory access or RDMA network, wherein each of the requester and the responder is an RDMA-enabled host of the network, the steps comprising:
randomizing a value of a mapped steering tag at a requester;
sending a request for the responder to provide data, wherein the request comprises the randomized mapped steering tag, and the randomized mapped steering tag is obtained by mapping a set of memory buffers of the requester onto a single representation that allows for identifying each of the memory buffers of the set; and
receiving the requested data together with the randomized mapped steering tag and assigning the data being received to the memory buffers of the set consistently with the mapping,
wherein the sending and receiving steps are performed at the requester.

* * * * *